United States Patent [19]

Peterson

[11] 4,044,471
[45] Aug. 30, 1977

[54] YARDAGE COUNTER ATTACHMENT FOR GOLF CARTS AND THE LIKE

[76] Inventor: Oscar Fredrick Allan Peterson, 3125 Portage Ave., Winnipeg, Manitoba, Canada

[21] Appl. No.: 677,698

[22] Filed: Apr. 16, 1976

[51] Int. Cl.² ............................................. G01C 22/00
[52] U.S. Cl. ................................. 33/141 R; 235/95 R
[58] Field of Search ............................. 33/141 R, 142; 235/95 R; 74/439, 450

[56] References Cited

U.S. PATENT DOCUMENTS

| 41,896 | 3/1964 | Washburn | 74/439 |
|---|---|---|---|
| 596,947 | 1/1898 | Scholfield | 74/450 |
| 919,776 | 4/1909 | Sanford | 235/95 R |
| 925,078 | 6/1909 | Browne et al. | 235/95 R |
| 1,708,708 | 4/1929 | Tibbetts | 235/95 R |
| 1,835,804 | 12/1931 | Morra | 33/141 R |
| 3,629,557 | 12/1971 | Lareau | 235/95 R |

FOREIGN PATENT DOCUMENTS 252,623   3/1927   Italy ........................................ 74/450

Primary Examiner—Harry N. Haroian
Attorney, Agent, or Firm—Stanley G. Ade

[57] ABSTRACT

Yardage measurement attachments for golf carts and the like normally have to be factory installed or else use a fricton type actuator which slips when wet. The present device can be installed readily and easily and without detaching the wheel from the cart. It includes a split disc which can be bolted to the face of one of the wheels said disc having teeth or notches around one face thereof adjacent the outer rim. These engage with a gear in a converter supported by the axle and the gear drives a flexible cable which in turn attaches to a cutter mounted on or near the handle of the cart. A cable can be attached to the counter to show yardage covered or to show yardage remaining from a preset figure representing the yardage of the particular golf hole being played.

5 Claims, 5 Drawing Figures

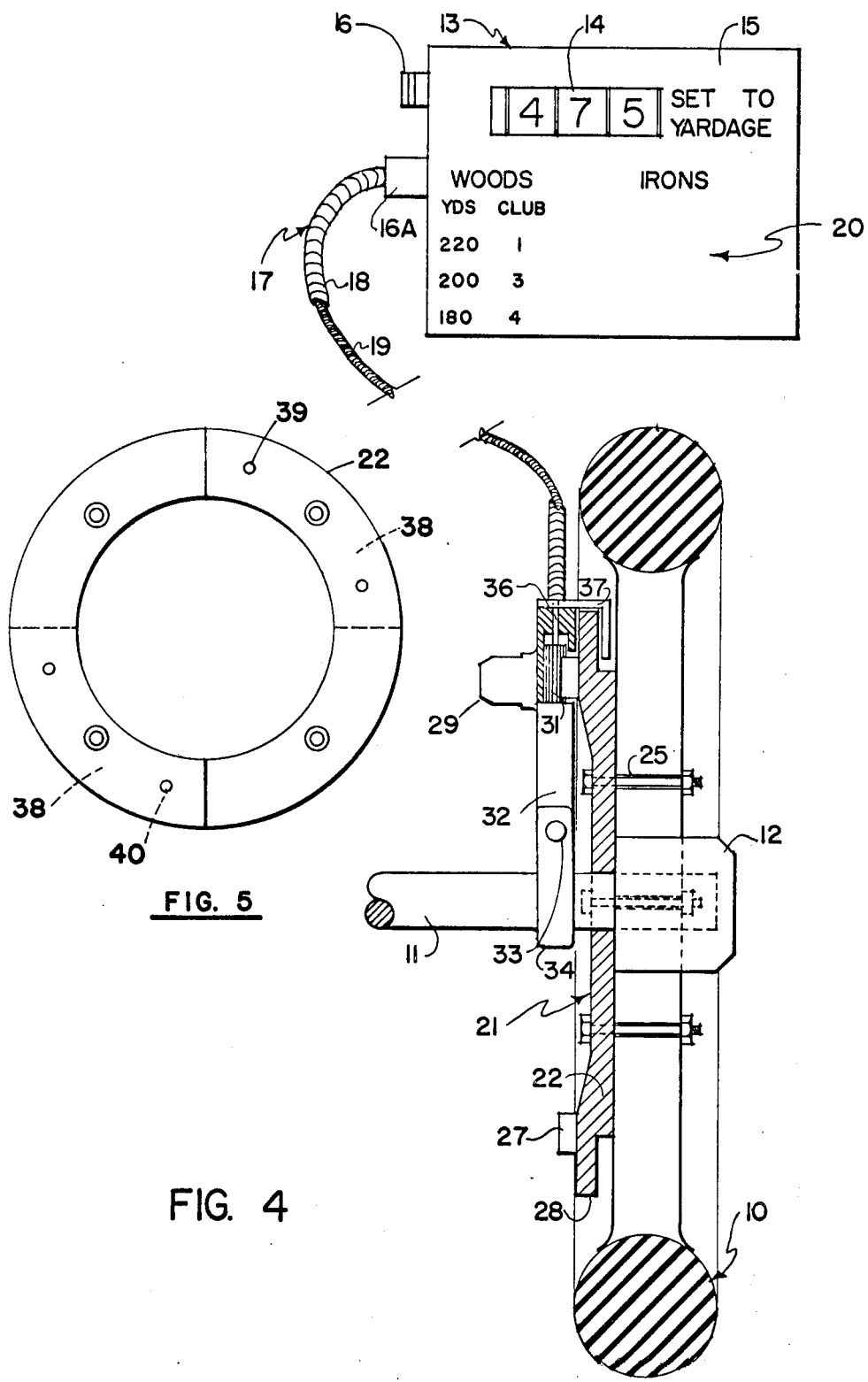

YARDAGE COUNTER ATTACHMENT FOR GOLF CARTS AND THE LIKE

BACKGROUND OF THE INVENTION

This invention relates to new and useful improvements in yardage measurement attachments for golf carts, it being understood that the term "yardage" includes measurements in meters or the like as well as yards.

Such attachments are used so that a player can preset the counter to zero at the beginning of a golf hole and thereby can calculate the approximate yardage left at any particular position on the golf hole thus assisting him in the selection of the golf club required.

Such devices are usually factory installed due to the fact that certain dismantling has to be undertaken. Alternatively, attachments are provided which operate by a small wheel frictionally engaging the tire of one of the golf cart wheels and this wheel connects through a flexible cable to a counter. However such devices slip badly particularly when used on wet ground so that they are not entirely satisfactory.

SUMMARY OF THE INVENTION

The present invention overcomes these disadvantages by providing a device which can be attached to the face of one wheel without detaching the wheel from the cart. It consists of a disc having teeth or notches formed on one face thereof adjacent the rim thereof, said teeth engaging a gear in a converter assembly supported from the axle. This gear drives a flexible cable which extends through a counter and the counter desirably is provided with two points of attachment for the cable. The first point of attachment measures yardage covered by the cart, it being understood that the counter can be set to zero at any time.

The second form of attachment enables yardage to be preset on the counter which is then reduced as the cart moves towards the golf green thereby enabling the player to ascertain approximately the distance remaining without any calculations being required.

The principle object and essence of the invention is therefore to provide a device of the character herewithin described which can readily be attached to a golf cart wheel without removing the wheel from the cart and which provides a positive drive to the counter.

Another object of the invention is to provide a device of the character herewithin described which is suitable for attachment to the majority of golf cart wheels without modifications being required.

A still further object of the invention is to provide a device of the character herewithin described which is simple in construction, economical in manufacture and otherwise well suited to the purpose to which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

FIG. 4 is a view at right angles to FIG. 2 with part of the converter sectioned to show the interior thereof.

FIG. 5 is a side elevation of an alternative disc construction reduced in scale with reference to FIG. 1.

In the drawings like characters of reference indicate corresponding parts in the different figures.

DETAILED DESCRIPTION

Figure 1:
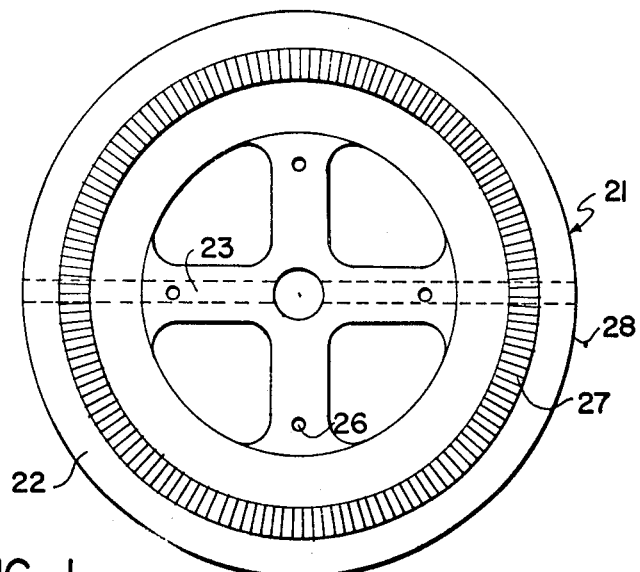
FIG. 1 is a side elevation of a disc attachable to a golf cart wheel.

Proceeding therefore to describe the invention in detail, reference character 10 illustrates a golf cart wheel, an axle 11 and being provided with a hub 12 holding the wheel in position in the usual way. The remainder of the golf cart is not shown as it is not believed necessary for the understanding of the invention.

However attached to or adjacent to the handle of the golf cart, is a counter attachment collectively designated 13 which includes a yardage or meter counter device 14 supported within a frame 15 and having two flexible cable attachments 16 and 16A. The details of the counter are conventional and well known so that it is not believed necessary to describe same further except to say that means are provided either to preset yardage on the counter or to set the counter back to zero.

A drive assembly in a form of a flexible cable 17 is provided, including an outer casing 18 and a flexible drive cable 19 therewithin and this assembly may be attached either to the connection 16 or 16A. If attached to connection 16A, then the yardage counter 14 counts yards traversed by the cart. However if attached to connection 16, the preset yardage on the counter will decrease depending upon the distance traversed by the cart so that a player can ascertain the distance remaining from the golf green if the length of the hole had been set on the yardage counter previously.

Various printed indicia 20 may be engraved on the frame 15 showing the clubs to be used for varying distances to be covered.

Figure 3:
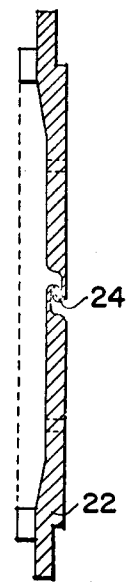
FIG. 3 is a side sectional elevation of FIG. 1.
Figure 2:
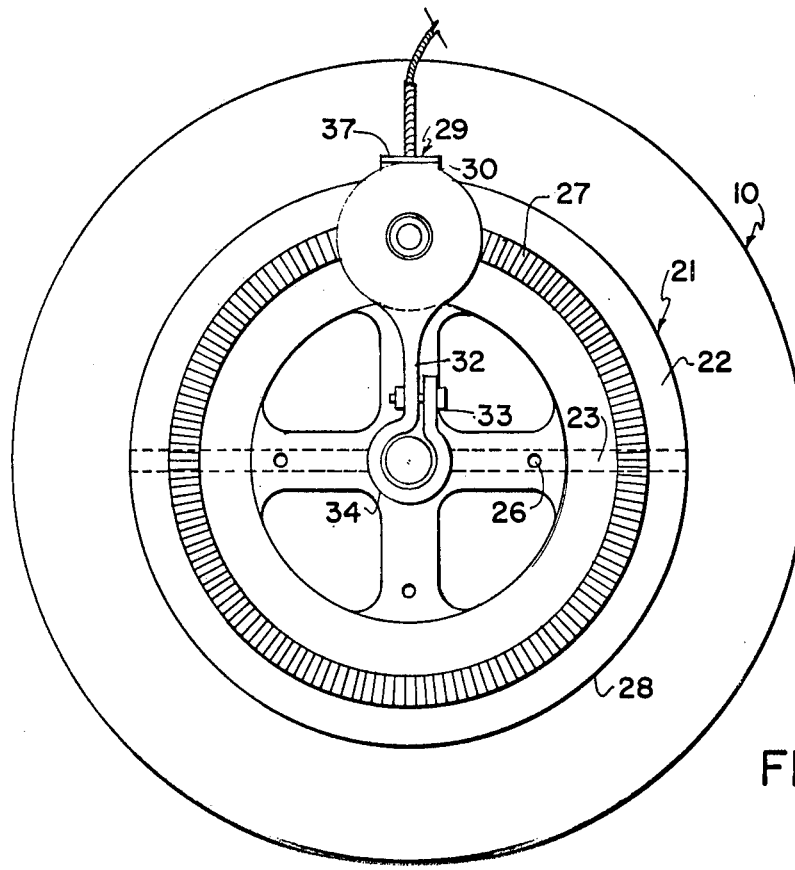
FIG. 2 shows the device attached to a golf cart wheel in side elevation.

A drive component is provided collectively designated 21 and takes the form of a disc 22 diametrically split as at 23 and provided with interlocking means such as that indicated by reference character 24 in FIG. 3 so that when the two halves are assembled as will hereinafter be described, they may interlock and form the completed disc. However other forms of interlocking may be provided.

The fact that the disc is split into two halves, enables it to be mounted to one face of the golf cart wheel 10 without the necessity of removing the wheel from the axle 11, it being understood that the two halves can be engaged around the axle and interlocked one with the other.

Nut and bolt assemblies 25 extend through aperatures 26 formed in the disc halves and bolt the disc concentrically to one side or face of the golf cart wheel 10 so that it revolves therewith. Notches or gear teeth 27 are formed on one side of the disc adjacent the rim 28 thereof and these are preferrably stamped into the disc when it is manufactured. Alternatively, a gear tooth ring may be secured to the disc during manufacture.

A converter assembly collectively designated 29 is provided and includes a support or bracket assembly 30 within which is mounted for rotation a gear 31 adapted to engage the gear teeth 27 on the disc.

Means are provided to support the converter adjacent the gear teeth, taking the form of a bracket 32 secured around the axle 11 by means of nut and bolt assemblies 33 and cap 34 and the converter assembly is supported within the distal end of the bracket 32.

The other end of the flexible cable assembly 17 is connected to the shaft 36 mounting the gear 31 within the converter casing 30.

A retainer bracket 37 extends from the converter casing 30 and freely engages over and around the rim 28 of the disc and assists in maintaining the gear teeth 27 in engagement with the gear 31 if any outward movement occurs through any reason.

It will of course be appreciated that the ratio between the gear teeth 27 and the gear 31 is such that the distance travelled by the wheel 10 indicates the yardage on the counter 14.

In operation, and depending upon the connection of the cable assembly 17 to the connection 16 or 16A, the yardage counter is set to zero whereupon the distance travelled by the cart will be read in yards or meters on the yardage counter. The player then calculates the distance remaining and selects the correct club.

Alternatively, the length of the golf hole being played is set upon the counter 14 whereupon the movement of the cart reduces the yardage so that the player may read the approximate yardage remaining, directly from the counter without any calculations being necessary.

The device is readily attached to existing golf carts without the necessity of removing the wheels with the gear ratio between the gear teeth 27 and the gear 31 being chosen to suite the diameter of the golf cart wheel to which it is attached.

FIG. 5 shows an alternative embodiment to the disc 22. This disc is also formed in two halves and each half is formed with an additional curved portion 38 which enables the two halves to be situated in the overlapped relationship shown in FIG. 5 to form the completed disc. In this regard, small projections 39 are formed on one of the overlapping portions 38 with corresponding apertures 40 being formed on the other so that when they are in the correct position shown in FIG. 5, the projections 39 engage the apertures 40 thus locating the two halves in the desired relationship. The completed disc is of course secured to the wheel by means of bolts 25 as hereinbefore described.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In a yardage measurement device for use on golf carts and the like which include a pair of ground engaging wheels, and axles bearingly mounting said wheels for rotation, said device including a settable distance counter mounted on the golf cart; the improvement which comprises in combination a drive component securable to one of said ground engaging wheels, a rim on said component, gear tooth means on said component adjacent said rim, a converter assembly, means to support said assembly adjacent said component whereby said gear tooth means operatively engages said converter assembly, and flexible cable drive means operatively extending from said converter assembly to said distance counter, said means to support said assembly adjacent said component including a bracket detachably clampable to one of said axles, said converter assembly being secured to the distal end of said bracket, and a retainer clip secured to said converter assembly and freely engaging over and around the rim of said component.

2. The improvement according to claim 1 in which said drive component includes a disc-like member diametrically split into two halves and securable to the face of one of one of said ground engaging wheels, and means to secure said member to said face.

3. The improvement according to claim 2 in which said gear tooth means is formed on one face of said disc-like member adjacent the rim thereof.

4. The improvement according to claim 2 in which each of said halves includes an overlapping portion so that said halves can be placed in overlapping relationship one with the other to form the completed disc, and stud means co-operating between said halves to detachably locate said halves in the correct position one with the other.

5. The improvement according to claim 3 in which each of said halves includes an overlapping portion so that said halves can be placed in overlapping relationship one with the other to form the completed disc, and stud means co-operating between said halves to detachably locate said halves in the correct position one with the other.

* * * * *